US010268991B1

(12) United States Patent
Davison

(10) Patent No.: US 10,268,991 B1
(45) Date of Patent: Apr. 23, 2019

(54) DYNAMIC SELECTION ACROSS CACHE

(75) Inventor: Alan G. Davison, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 619 days.

(21) Appl. No.: 13/245,681

(22) Filed: Sep. 26, 2011

(51) Int. Cl.
G06Q 40/00 (2012.01)
G06Q 20/00 (2012.01)
(52) U.S. Cl.
CPC .................................. G06Q 20/00 (2013.01)
(58) Field of Classification Search
CPC ..................................................... G06Q 20/00
USPC ..................... 705/35, 40, 38, 39, 44
See application file for complete search history.

(56) References Cited

U.S. PATENT DOCUMENTS

| | | | |
|---|---|---|---|
| 8,254,260 B1* | 8/2012 | Bajpay | H04L 41/0627 370/235 |
| 2004/0199472 A1 | 10/2004 | Dobbins | |
| 2004/0215560 A1* | 10/2004 | Amalraj | G06Q 20/04 705/40 |
| 2004/0230674 A1 | 11/2004 | Pourheidari et al. | |
| 2012/0041879 A1 | 2/2012 | Kim et al. | |

* cited by examiner

Primary Examiner — Ojo O Oyebisi
(74) Attorney, Agent, or Firm — Knobbe, Martens, Olson & Bear, LLP

(57) ABSTRACT

Examples of systems and methods are described for managing payment transaction requests. A request for payment may be received and then routed to one or more payment processors. For a given request, more than one payment processor may be used. The particular payment processor selected for processing the payment may be based on a decision rule that is associated with the more than one payment processor. A decision engine may utilize the decision rule, select a payment processor, and process the payment with the selected payment processor.

15 Claims, 6 Drawing Sheets

DYNAMIC SELECTION ACROSS CACHE

BACKGROUND

Computing devices and communication networks can be utilized to exchange information. In a common application, a computing device can request content from another computing device via the communication network. For example, a user at a personal computing device can utilize a software browser application to request a Web page from a server computing device via the Internet.

Goods and service providers (e.g., "merchants") may provide customers with the option of paying with funds electronically. Customers may use a credit card account, gift card account, or other electronic means of payments to purchase the goods or services offered by the merchants. The merchants may operate an online store, or website, where customers may purchase goods using their software browser application. Merchants, in order to effectively process electronic payments, may use payment platforms provided by themselves or third parties. Payment platforms may manage payment transaction workflow and communicate with one or more payment processors offered by banks or other financial institutions that allow merchants the ability to accept non-cash payments. The payment platform gives the merchant one point of contact for payment, however, also provides the flexibility of accepting multiple types of payment instruments.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Figure 1A:
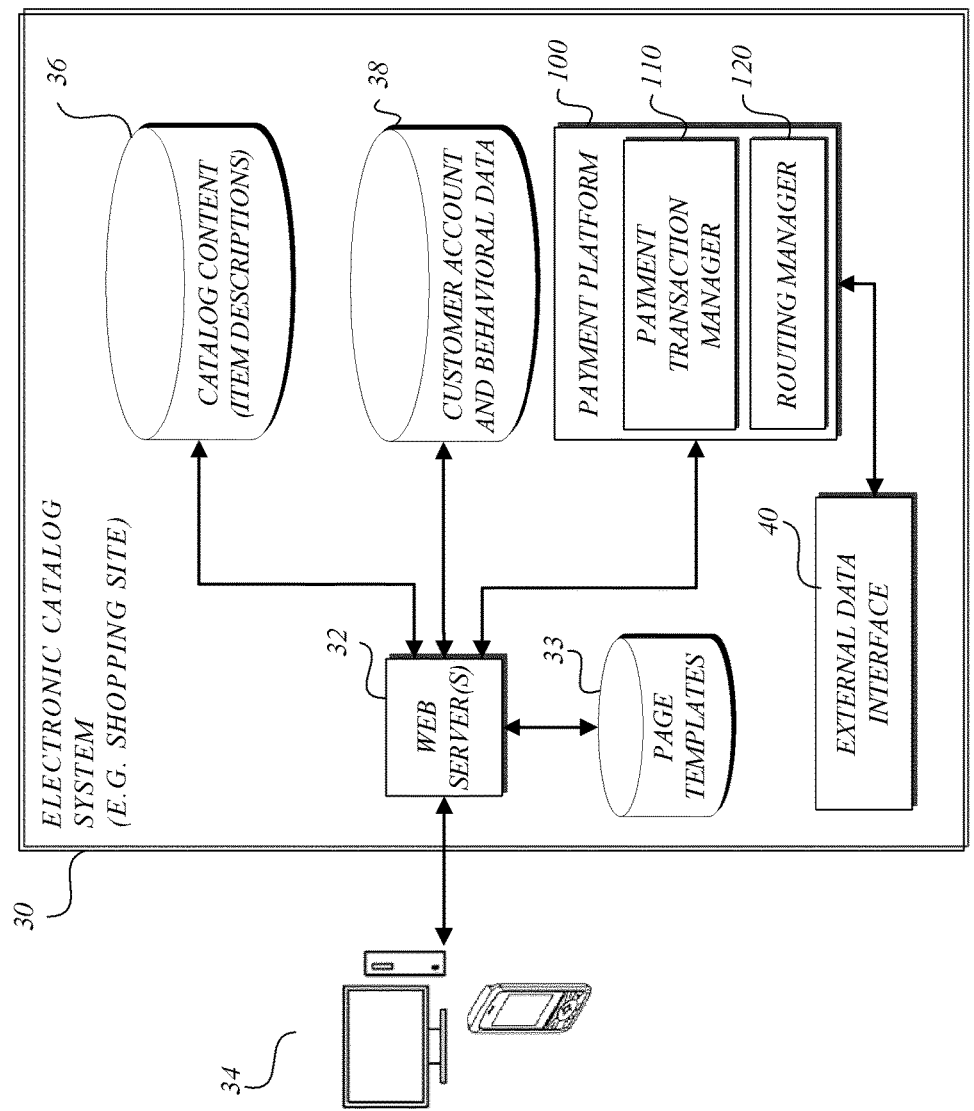
FIG. 1A schematically illustrates an embodiment of an electronic catalog system.

In some implementations, a payment platform can include a payment transaction manager, which receives a payment transaction requests from a merchant, and a routing manager, which may determine one or more payment processor to which the payment transaction may be routed. A payment processor is a broad term that is used in its general sense, and may include a company (e.g., MasterCard®, Visa®, Heartland Payment Systems, etc.) appointed by a merchant to handle credit card transactions for merchant banks.

Many payment platforms traditionally have been static, for example, given particular input criteria for a payment transaction, only one payment processor may be returned. Since a result for a given input may be deterministic and updates to the payment processor dataset may be relatively rare, caches can be used within the payment platform in order to more efficiently use system resources. In various implementations, the use of caches can offer advantages of reducing latency in requests for payment processing or improving availability of payment processor data in the event a routing manager server is offline. In addition, scaling requirements for the routing manager server may be reduced since the use of caches can result in a lower rate of requests from payment transaction manager clients.

As the payment platform space evolves, user cases are emerging that require dynamic payment processor routing. For example, it may be advantageous for a routing manager to phase-in new payment processors by slowly shifting the load from old payment processors to the new payment processors. This may be done, for example, by increasing the new payment processors' load while at the same time proportionately decreasing the old payment processors load.

Due to the extensive use of caching in payment platforms, dynamic routing may be challenging to implement in some systems. For example, in some implementations, dynamic routing may be implemented using percentage based routing. Percentage based routing can include a scheme where a first percentage of transactions are routed to a first payment processor, while a second percentage of transactions are routed to a second processor, and so forth. Implementation of percentage based routing on a server side cache may produce undesired results. For example, suppose, in the following illustrative example, that for a given request criteria A, it is desired to route 25% of the traffic to payment processor X and 75% of the traffic to payment processor Y. When the routing manager receives a request with criteria A, it may randomly decide that the transaction should be routed to payment processor X. The routing decision would be cached, and every subsequent request containing criteria A during the cache's time-to-live ("TTL") would then be routed to payment processor X. When the TTL expires and a new routing decision is determined, the routing manager server may decide that the transaction should be routed to payment processor Y and every subsequent request containing criteria A during the cache's TTL would then be routed to payment processor Y. As a result, in this illustrative example, the routing manger is returning a toggled routing decision based on the TTL of the cache; during the last two TTL cycles, 50% of the payment transactions were routed to payment processor X and 50% of the payment transactions were routed to payment processor Y. This toggling effectively compromises the desired routing of sending 25% of the traffic to payment processor X and 75% of the traffic to payment processor Y.

Accordingly, the present disclosure provides examples of dynamical selection of payment routing decisions across a cache by allowing a routing manager server to return to a payment transaction manger client a result set containing a plurality of results and decision rules for selecting a particular result from the plurality of results. In some of these examples, since the dynamic selection occurs at the payment transaction manger client, resources may be efficiently allocated and the desired dynamic transaction balancing may be achieved.

In one aspect, a payment platform that can be responsible for handling electronic payment transaction requests and routing those requests to a payment processor is disclosed.

The payment platform may include one or more payment transaction managers that may receive payment requests from business entity computing systems. When the payment platform receives a request to manage an electronic payment, the payment transaction manager may request information from a routing manager to determine where to route a particular payment transaction for processing. The routing manager may return a result set including more than one payment processing routing options and a decision rule, such as a percentage based decision rule, for selecting one of the payment processing routing options of the result set. The payment transaction manager may then use the decision rule to select a particular payment processor routing option, and then communicate payment transaction data to the selected payment processor. The payment platform may be implemented in a client-server architecture where the payment transaction managers are clients computing devices and the routing manager is a server computing device.

Although various aspects of the disclosure will be described with regard to illustrative examples and embodiments, the disclosed embodiments and examples should not be construed as limiting. For example, the illustrative embodiments may describe particular data elements that may be communicated across computing systems, however, the processes described herein may be applied to data elements not described. In addition, while the illustrative embodiments may describe specific levels of caching, fewer cache levels, or additional cache levels, may be utilized to perform the processes and methods of the systems described herein. Furthermore, while certain modules or caches are described illustratively as part of a client or a server, the modules or caches may reside on additional or different computing systems, and the interface between client and server may be implemented differently than described.

Example System (FIG. 1A)

FIG. 1A schematically illustrates one embodiment of an electronic catalog system 30. Electronic catalog system 30 may be implemented as a computerized system that comprises multiple programmed computing devices (e.g., web server machines, application servers, storage servers, load balancers, etc.) that communicate over one or more networks. Electronic catalog system 30 may host a web site that provides functionality for users to browse an electronic catalog of items that are available for purchase. The items represented in the catalog may include, for example, physical products, music downloads, video downloads, electronic books, software applications, magazine subscriptions, mobile service plans, and other types of items that can be purchased or licensed. Although described in the context of a web site, the inventive features described herein can also be implemented in other types of interactive systems, including interactive television systems. Further, although described in the context of products that are available for purchase, the disclosed features are also applicable to other types of items, including services, news articles, blogs, web sites, and television shows.

As illustrated in FIG. 1A, electronic catalog system 30 can include one or more web servers 32 that respond to page requests received over the internet from user computing devices 34 (e.g., personal computers, portable computing devices, mobile phones, electronic book readers, PDAs, etc.) of end users. Catalog system 30 also includes a repository of catalog content 36. Catalog content 36 may include, for example, product images, product descriptions, user ratings and reviews of particular products, price and availability data, seller data, etc. A search engine (not shown) enables users to search the catalog by submitting free-form search strings.

The catalog system 30 also includes a repository 38 of customer account data for users who have created accounts with the system ("customers"). Customer account data may include, for example, usernames, passwords, payment information, shipping information, item ratings, and wish lists. Repository 38 may also include various types of collected behavioral data reflective of the customer's browsing activity. The behavioral data may include item selection data for items selected by users of the catalog system. For example, the item selection data may include purchase histories, search histories, and item detail page viewing histories. Purchase histories can include purchases or rentals of items for physical delivery or electronic download (e.g., music or video downloads). The item selection data can also include likes and preferences of the customer for items, authors, artists, directors, genres, etc.

Figure 1B:
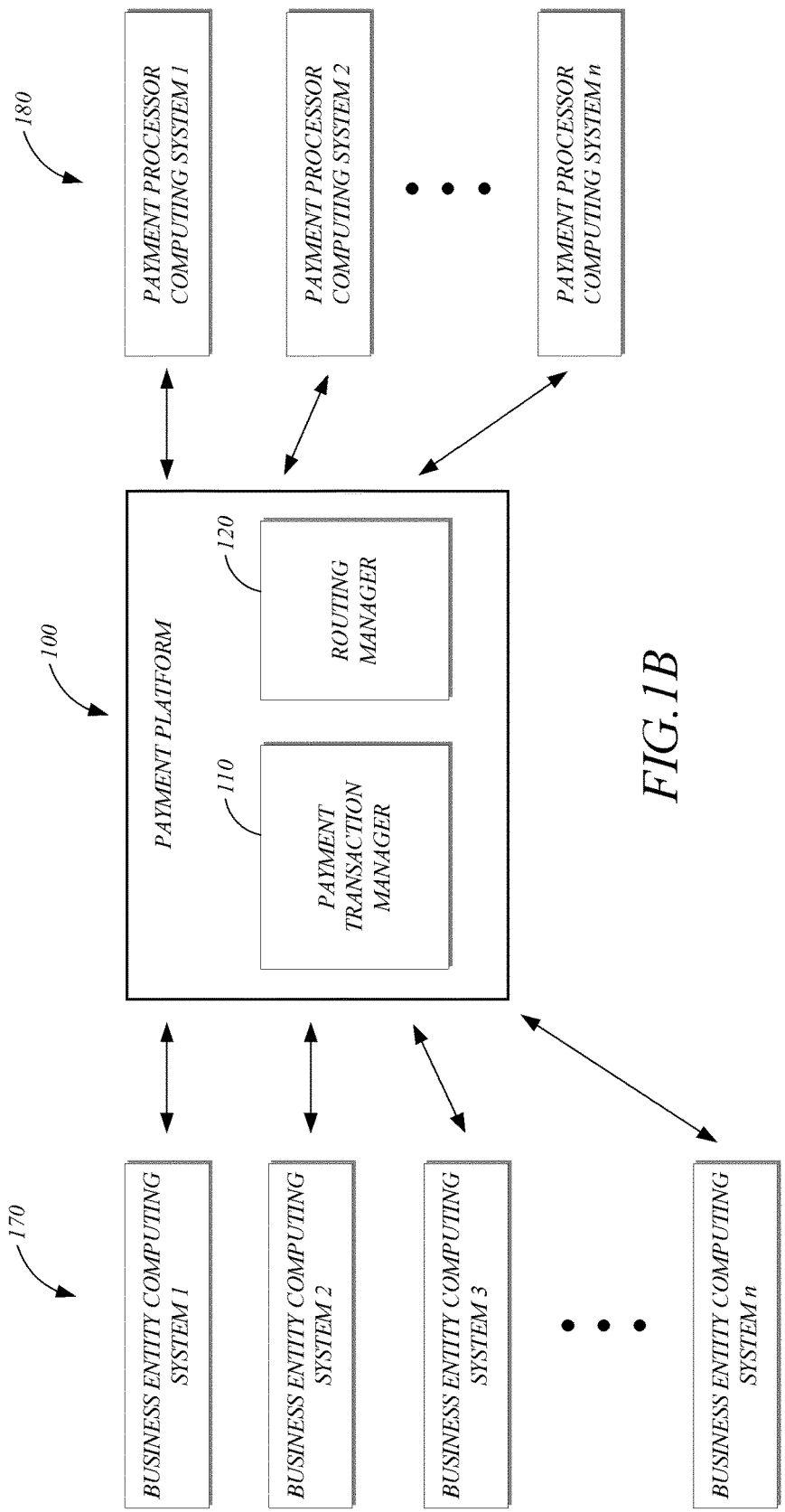
FIG. 1B is a block diagram illustrative of an example of a payment platform in communication with a plurality of business entity computer systems and a plurality of payment processor computer systems.

The catalog system may also include a payment platform 100. The payment platform 100 may handle payments made by customers purchasing items from the catalog system 30. For example, the payment platform 100 may collect credit card or gift card information from customers and communicate that information to one or more payment processor computer systems. The payment processor computer systems (as shown in FIG. 1B) may check the details of the payment information, carry-out anti-fraud measures, and settle payment. In some embodiments, the payment platform 100 may comprise a payment transaction manager 110 and a routing manager 120. The payment transaction manager 110 may perform payment transaction functions such as receiving payment transaction requests for computing systems, routing payment data to payment processor computing systems, creating an identifier for payment transactions functions, which may be referred to herein as a "workflow", and communicating the results of payment transactions to the requesting computing systems. The routing manager 120 may determine one or more payment processing computing systems that match the payment parameters collected by payment transaction manager and communicate their identification to payment transaction manager 110 During the lifecycle of a workflow, multiple calls may be made by the payment transaction manager 110 to the routing manager 120. As will be discussed herein, embodiments of the payment platform 100 may include functionality such that the multiple calls within the workflow provide consistent and/or definable behavior during the life cycle of the workflow. Although described as a component of catalog system 30, the payment platform 100 (or the payment transaction manager 110 and/or the routing manager 120) may by implemented by one or more computer systems external to, and in communication with, catalog system 30. For example, payment platform 100 may be hosted on a computing system that is dedicated to performing the operations of the payment platform 100 and communicates with the catalog system 30 via a network.

The electronic catalog system 30 may associate with each customer of the system 30 a unique customer identifier, token, or key (e.g., a "customer ID"). The customer ID can be used by the system 30 to access the customer account data from the repository 38. To protect the privacy of customers, the customer ID typically does not include any information that would allow the customer to be personally identified from the customer ID.

The electronic catalog system 30 may also include functionality and components (not shown) for enabling users to perform various other types of functions, including but not limited to the following: (a) purchasing items selected from the electronic catalog, (b) creating wish lists of items selected from the catalog, and searching for and viewing the wish lists of other users, (c) conducting keyword searches for specific catalog items, (d) browsing the catalog using a category-based browse tree, (e) creating personal profiles that are viewable by other users, (f) posting items for sale in the electronic catalog, (g) tagging specific catalog items, and (h) posting customer reviews and ratings of particular catalog items.

The various components shown in FIG. 1A may be implemented in an appropriate combination of hardware and software. For example, the web servers 32 and 54 may be implemented using physical servers (with processors, memory, etc.) that are programmed with executable program code to respond to display page requests by generating and returning web pages. As discussed, the payment platform 100 can be implemented in an appropriate combination of computer hardware and software. Further, although schematically illustrated as a part of the electronic catalog system 30, in other embodiments the payment platform 100 may be owned or operated separately from the catalog system 30.

Examples of Payment Platforms

FIG. 1B is a block diagram illustrative of one embodiment of a payment platform 100 in communication with one or more computing devices of business entities 170 and one or more computing devices of the payment processors 180. Business entities computing systems 170 may be computer systems operated by merchants that sell goods or services. The catalog system 30 itself may be an example of a business entity computing system. For example, the catalog system 30 may process certain types of payment transactions such as gift card redemptions. Payment processor computer systems 180 may be computer systems operated by companies appointed by the merchants to handle credit card, debit card, gift card, pre-paid accounts, or other payment instrument transactions for banks, payors, payment clearing houses, etc. The payment platform 100 may, for example, handle payment transaction requests from the business entity computing systems 170 and use payment processor computing systems 180 for executing payments. In one embodiment, payment platform 100, the business entity computing systems 170 and the payment processor computing systems 180 may be computing systems that are in communication across a network. For example, business entity computing systems 170, payment platform 100 and payment processor computing systems 180 may be geographically separated computing systems that communicate over a wide area network or the internet. In another embodiment, payment platform 100, business entity computing systems 170 and payment processor computing systems 180 may be co-located and may form part of a larger computer system.

In one embodiment, the payment platform 100 handles the management of payment processing. The management may include, among other things, receiving a request from a goods or services provider (e.g., a "merchant") to process a payment transaction. Once a request is received, the payment platform 100 may create a workflow for managing the payment transaction lifecycle. For example, payment platform 100 may obtain payment instrument information, determine payment processing routing requests, route payment requests to an appropriate payment processor, receive transaction results from the payment processor and return the results (such as, for example, approved or denied) to the requesting merchants. During the lifecycle of a workflow, multiple calls may be made by the payment transaction manager 110 to the routing manager 120. The workflow may also be used to associate multiple payment processing requests and results with one transaction request. For example, payment platform 100 may receive a request to process a transaction where a paying customer wishes to pay for goods with more than one payment instrument (for example, a gift card and a credit card). Payment platform 100 may then create a workflow for the transaction and manage the requests to multiple payment processors using the workflow identifier. The workflow identifier, of flag, may then be used for processing within the payment platform so that any processing decisions made during the lifecycle of the workflow are consistent.

Business entity computing systems 170 may, in some embodiments, be computer systems operated by one or more merchants or goods or services providers that may be interested in processing payments. For example, one of business entity computing systems 170 may be a website that offers goods for sale and accepts credit card payments from their customers. A customer may select the goods they are interested in purchasing and then proceed to "check out" to purchase their goods. Business entity computing systems 170 may wish to provide the option of paying with a credit card (or some other type of payment instrument). In such embodiments, business entity computing systems 170 may make a transaction request of payment platform 100 to facilitate payment processing. In other embodiments, business entity computing systems 170 may be a dedicated payment client, such as a point-of-sale terminal. Business entity computing systems 170 may also be, in other embodiments, computer systems operated or managed by different units of one merchant. For example, one goods provider may have separate business entity computer systems for selling books online, selling music online and selling house goods in a brick-and-mortar store. Each of the business entity computing systems of the goods provider may request payment platform 100 to process payment transactions. The business entity computing systems 170 may represent any computing system that could submit payment transaction to the payment platform 100 and can include computing systems operated by one or more merchants Payment processor computing systems 180 may be computers systems operated and managed by entities that offer merchant account services. For example, payment processor computing systems 180 may be managed by a third party that receives requests for payments and routes the requests to a credit card computer network. Alternatively, payment processor computing systems 180 may be operated and managed by credit card networks or banks that offer merchants and good or services providers the ability to accept credit or debit card payments. In other embodiments, payment processor computing systems 180 may be computer systems that could handle payments to be credited to prepaid credit or debit accounts. For example, payment processor computing systems 180 may be managed or controlled by an entity that transfers money from a gift card account to a merchant or goods or services provider.

As shown in the embodiment of FIG. 1B, payment platform 100 may comprise a payment transaction manager 110 and a routing manager 120. In some embodiments, payment transaction manager 110 and routing manager 120 may be modules executed within the same computing system. In other embodiments, payment transaction manager 110 and routing manager 120 may be separate computing devices that communicate, for example, using a client-server architecture.

Figure 2:
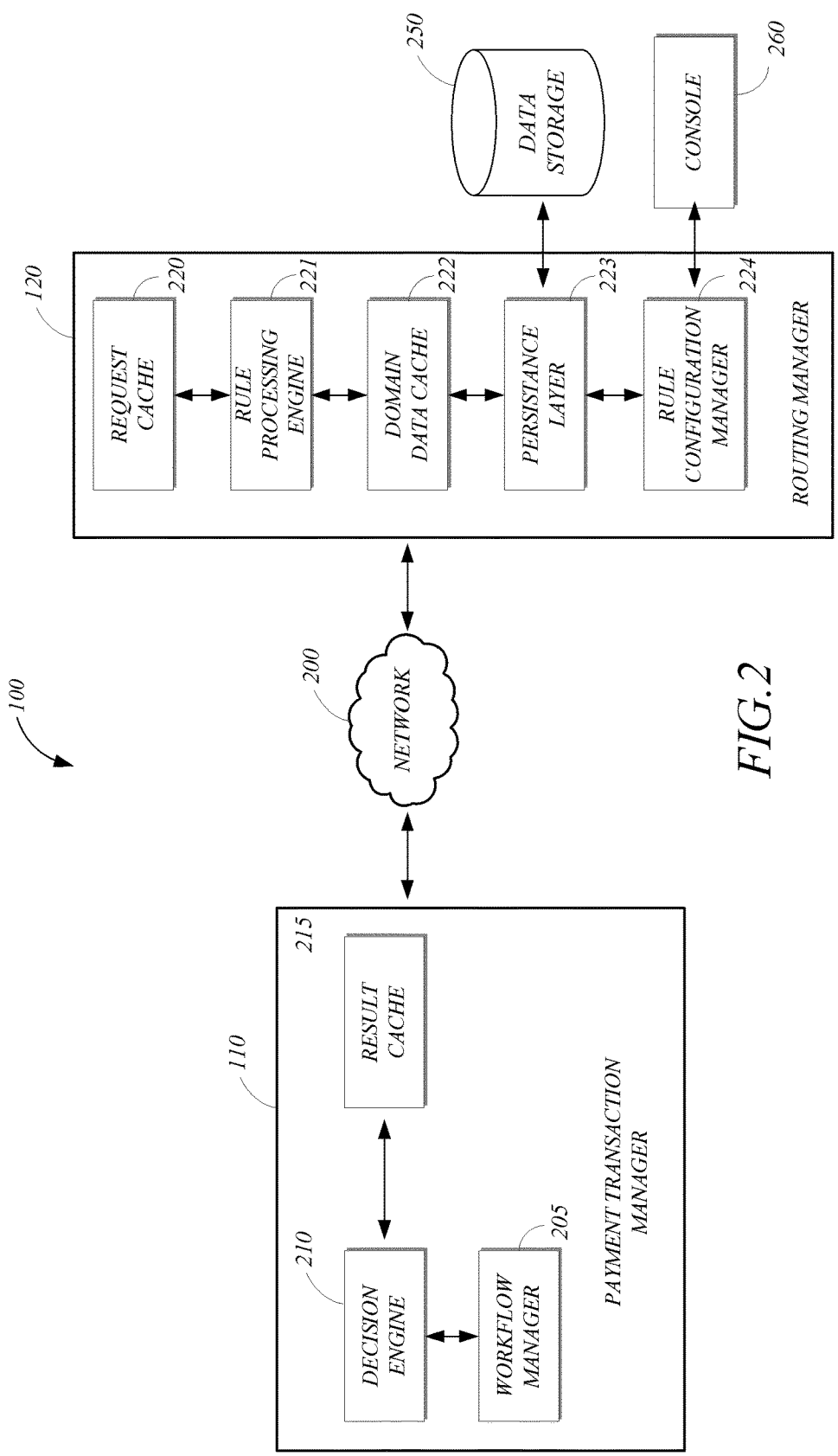
FIG. 2 is a block diagram illustrative of one embodiment of a payment platform including an example of a payment transaction manager and an example of a routing manager configured in a client-server architecture.

FIG. 2 is a block diagram illustrative of one embodiment of payment platform 100 including payment transaction manager 110 and routing manager 120 configured in a client-server architecture. As shown in the illustrative embodiment of FIG. 2, payment transaction manager 110 and routing manager 120 may communicate over network 200. Depending on the embodiment, network 200 may comprise one or more of any type of network, such as one or more local area networks (LANs), wide area networks (WANs), personal area networks, telephone network, and/or the Internet, which may be accessed via any available wired and/or wireless communication protocols. Thus, network 200 may comprise a secure LAN through which payment transaction manager 110 and routing manager 120 communicate, and network 200 may further comprise an Internet connection through which payment transaction manger 110 and routing manager 120 communicate. Any other combination of networks, including secured and unsecured network communication links, are contemplated for use in the systems described herein. In some embodiments, payment transaction manager 110 may be geographically co-located with routing manger 120, for example, they may be part of the same local area network. In another embodiment, payment transaction manger 110 and routing manager 120 may be in geographically distinct locations and communicate over a wide area network or the Internet.

As shown in the illustrative embodiment of FIG. 2, payment transaction manager 110 may comprise a workflow manager 205, decision engine 210 and a result cache 215. As described further herein, the workflow manager 205 may create and manage a new workflow for when payment processing requests are received. In some embodiments, the decision engine 210 advantageously can choose a particular payment processor from among many possible payment processors contained in a result set transmitted to payment transaction manager 110 from routing manager 120. Decision engine 210 may choose the particular payment processor based upon a decision rule, or multiple decision rules that are part of the metadata of the result set.

In some embodiments, payment transaction manager 110 may comprise result cache 215. Result cache 215 may be a memory module that temporarily stores result sets returned by routing manager 120 in response to requests made by payment transaction manager 110. In so doing, result cache 215 may increase or optimize the operation of payment transaction manager 110. For example, if payment transaction manager 110 receives a request from a business entity to process a transaction, it may first check result cache 215 to determine if a result set matching the request has been recently received from routing manager 120. If so, then the result set stored in result cache 215 may be processed by decision engine 210 thus saving the time required to make a payment processor result set request of routing manager 120. The result cache 215 may be implemented as any type of hardware or software cache.

FIG. 2 also illustratively shows other components implemented by this example routing manager 120. As shown in the embodiment of FIG. 2, the routing manager 120 may comprise a request cache 220, a rule processing engine 221, a domain data cache 222, a persistence layer 223 and a rule configuration manager 224. Request cache 220 may be a memory module that temporarily stores result sets previously transmitted to payment transaction manager 110. Thus, as routing manager 120 receives requests for a payment processor result set, it may check request cache 220 to determine if a recent request with the same criteria has been received that matches the currently requested criteria and may return the same result set in response to the previous recent request. Rule processing engine 221 may be a module that advantageously matches received requests for payment processing with a set of payment processors and one or more rules associated with the payment processors. The one or more rules may be stored in data storage 250. As rule processing engine 221 receives requests for payment processors, it may analyze the request to determine one or more payment processors that would be best suited for the transaction request (e.g., the one or more payment processors that best match the requested criteria based at least in part on rules implemented by the rule processing engine). In some embodiments, routing manager 120 may comprise domain data cache 222, which may advantageously provide an in-memory representation of a set of payment processors and their associated decision rules.

In some embodiments, rule processing engine 221 may also request routing rules from persistence layer 223. Persistence layer 223 may contain objects that manage data persistence. In some embodiments, persistence layer 223 may be supported by data storage 250. For example, the objects of persistence layer 223 may correspond to one or more data tables of data storage 250 and may have methods for executing actions upon the data tables of data storage 250. In addition to rules matching transactions requests to payment processors, persistence layer 223 and data storage 250 may also include decision rules that may be used by decision engine 210 of the payment transaction manager 110 to decide which payment processor may be selected from a set of payment processors. For example, data store 250 may have a rule that returns more than one possible payment processor. In such event, a decision rule may exist that may guide decision engine 210 as it decides which particular payment processor to use for processing a payment transaction.

In some embodiments, persistence layer 223 and data storage 250 may be updated via rule configuration manager 224 and console 260. Rule configuration manager 224 may be responsible for accepting rule inputs from console 260 and then communicating those inputs to persistence layer 223. In some embodiments, modification of payment processor rules and decision rules may be achieved through the use of console 260. Console 260 may, in some embodiments, provide a user interface allowing a user to create, modify, or delete payment processor rules and/or decision rules. Console 260 may be implemented using a GUI, or other embodiments, may be implemented using a command line interface. Console 260 may accept data files or data objects in order facilitate batch processing of rule creation, modification and update. The console 260 (or the payment transaction manager or the routing manager) may implement an application programming interface (API) that can be used to permit a user computing system to interact with the payment platform 100.

Each cache of payment platform 100, result cache 215, request cache 220 and domain data cache 222 may advantageously have a TTL appropriate for its application. For example, result cache 215 may "flush" or "clear" allowing for data to be refreshed on a periodic basis. In some embodiments, the TTL may be set programmatically, or in other embodiments may be set via a user interface connected to payment transaction manager 110. The TTL may be any value that is appropriate given the frequency of transaction requests made of the payment platform. For example, the TTL may be 15 minutes in one embodiment that receives frequent requests, or it the TTL may be set to 60 minutes in payment platforms that receive a smaller volume of payment requests. TTLs may vary. For example, the TTL for result cache 215 may be 15 minutes, while the TTL for domain data cache 222 may be 30 minutes. TTLs may be set or updated by a user or manager of the payment platform, dynamically by the payment platform (e.g., based at least in part on the volume of payment requests), and so forth.

In some embodiments, a forced refresh of a cache may be performed. A forced refresh may be desirable where a high severity problem, such as a complete failure of one or more payment processors, has occurred. In one embodiment, each cache may listen to a broadcast channel for actions or events indicating a forced refresh may be required. The forced refresh may be selective, in that it may pertain to particular results, or the forced refresh may be complete, in that the forced refresh completely emptied the cache so that no results remain.

Figure 3:
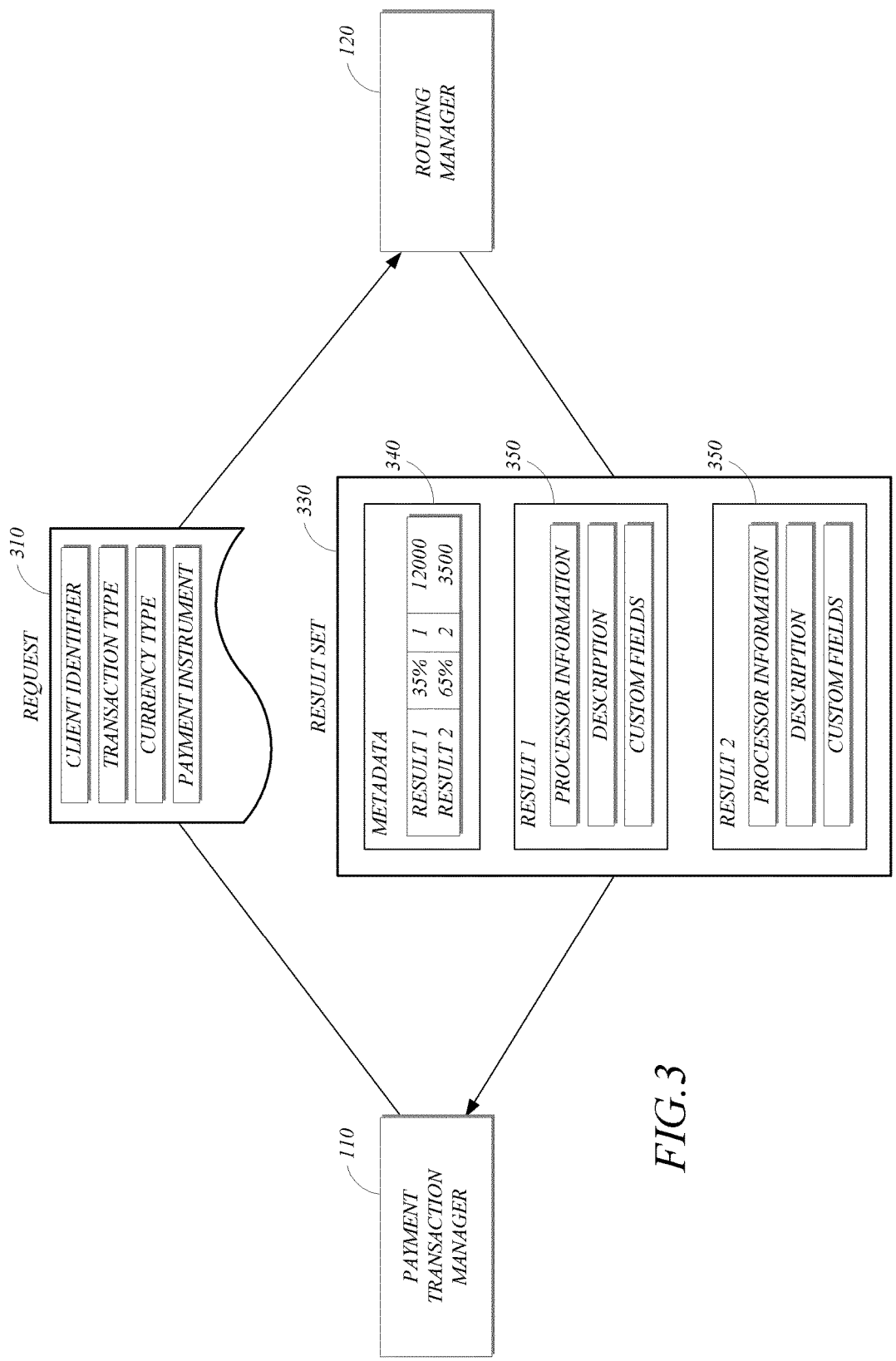
FIG. 3 is a block diagram illustrative of one embodiment of a payment platform illustrating examples of the structures of data that can be communicated between a payment transaction manager and a routing manager.

FIG. 3 is a block diagram illustrative of one embodiment of payment platform 100 illustrating examples of the structures of data communicated between payment transaction manager 110 and the routing manager 120. In general, payment transaction manager 110 may communicate request 310 to routing manager 120. In response, routing manager 120 may communicate result set 330. While the embodiment of FIG. 3 depicts particular examples of data structures, request 310 and result set 330 may comprise additional or different data elements, or may contain fewer data elements than are depicted in FIG. 3.

As payment transaction manager 110 receives requests from business entity computing systems 170 to initiate payment transactions, it may communicate requests, such as request 310, to routing manager 120 for payment processor routing information. In one embodiment, request 310 comprises a client identifier, a transaction type, a currency type and a payment instrument. Any of the fields of the request 310 can include multiple sub-fields. As will be further described below, in some implementations, the sub-fields may by "sticky" such that a second sub-field may depend on a first sub-field to provide consistent and/or definable behavior. The client identifier may comprise an indication of the business entity requesting a payment transaction. The transaction type may describe the type of transaction the business entity is requesting. For example, the transaction type may indicate that the business entity would like to initiate a debit or payment, verify approval, or initiate a credit to the account. In one example, the transaction type can include sub-fields such as an "Initiate payment" sub-field that could initialize the payment transaction, a "Finalize payment" sub-field used when the payment transaction is finalized, and a "Refund" sub-field used to indicate the amount or type of a refund (if applicable) after the transaction has been finalized. Calls with information in these sub-fields may occur to at different times (possibly, days or months apart), and the system may provide for "stickiness" in the transaction workflow to provide consistent and/or definable behavior throughout the life cycle of the workflow. For example, if the Initialize sub-field is set for payment via a debit card, the Finalize sub-field may not permit a change from the debit card to a credit card or gift card, which advantageously preserves the consistency of the payment transaction type. The payment instrument may describe the account to which the payment processor should apply the transaction. By way of example, request 310 may contain the following data "US Retail" (client identifier), "Initiate Payment" (transaction type), "USD" (currency type), and "Visa" (payment instrument).

Once routing manager 120 receives request 310 it may determine a plurality of results 350 that may be suitable to process request 310. Routing manager 130 may then bundle results 350 along with metadata 340 to create result set 330. Metadata 340 may include decision rules to be used by decision engine 210 to determine which particular result of the plurality of results may be used to process the payment transaction request sent to payment transaction manager 110 from business entity computing systems 170. In some embodiments, the metadata may include a percentage based routing rule. The percentage based routing rule may indicate the desired proportion of routing the particular payment processor should receive. For example, the illustrative embodiment of FIG. 3 indicates that Result 1 (e.g., payment by a first payment processor) should receive 35% of payment routing and Result 2 (e.g., payment by a second payment processor) should receive 65% of payment routing. Payment transaction manager 110 may then select one of the payment processors based on the result set 330. For example, it might generate a random number and select the payment processor based on the random number and the percentage associated with the payment processors. In other examples, the result set 330 may include a different number of results than shown in FIG. 3, for example, 1, 3, 4, 5, 10, 15, or more results.

In other embodiments, the metadata may include a hierarchical based routing rule. The hierarchal based routing rule may provide an indication of a rank order for payment processing. For example, the illustrative embodiment of FIG. 3 indicates that Result 1 should be the first payment processor to which a transaction should be routed, followed by Result 2. Once payment transaction manager 110 receives result set 330, it may first attempt to route a payment to Result 1 for processing. Payment transaction manager 110 may then wait for period of time, or time-out, for a response. If a response is not received within time-out, it may then attempt to route the payment to Result 2. The time-out may be set by a user or system manager or may be determined dynamically by the payment platform 100 (e.g., based at least in part on routing load to the payment processors).

In another embodiment, the metadata may include a load-based routing rule. The load based routing rule may provide an indication of the request load each payment processor. For example, the illustrative example of FIG. 3 indicates that Result 1 has been included in 12000 result sets, while Result 2 has been included in 3500 result sets. Once payment transaction manager 110 receives result set 330, it may select Result 2 for payment processing since it has a lighter query load and as a result may be a more efficient payment processor.

In some embodiments, results 350 may include data that can be used by payment transaction manager 110 to route transactions to the payment processor associated with the result. For example, result 350 may include processor information, description and custom fields, as shown in the example of FIG. 3. The processor information may include identification information uniquely identifying the payment processor such as, for example, a name, serial number, processing ID, or any other information to identify a computer system. The description may include additional information that may be used by payment transaction manager 110 to process payments. Custom fields may represent any number of custom data fields populated by routing manager that may of use to payment transaction manager 110 when processing payment transactions.

Examples of Processes for Processing Payments

Figure 4:
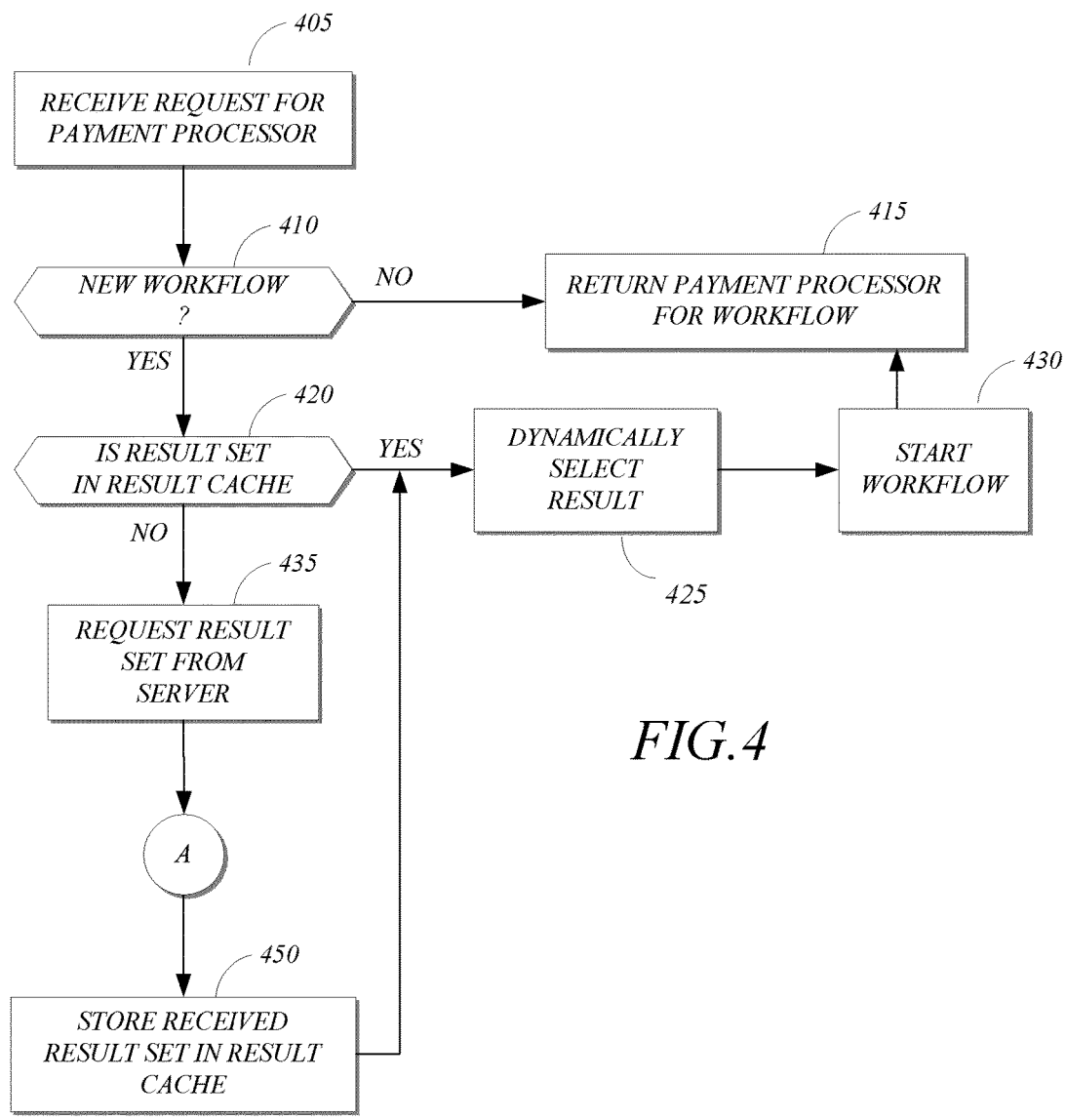
FIG. 4 is a flow diagram illustrative of an example of a process for processing payments.
Figure 5:
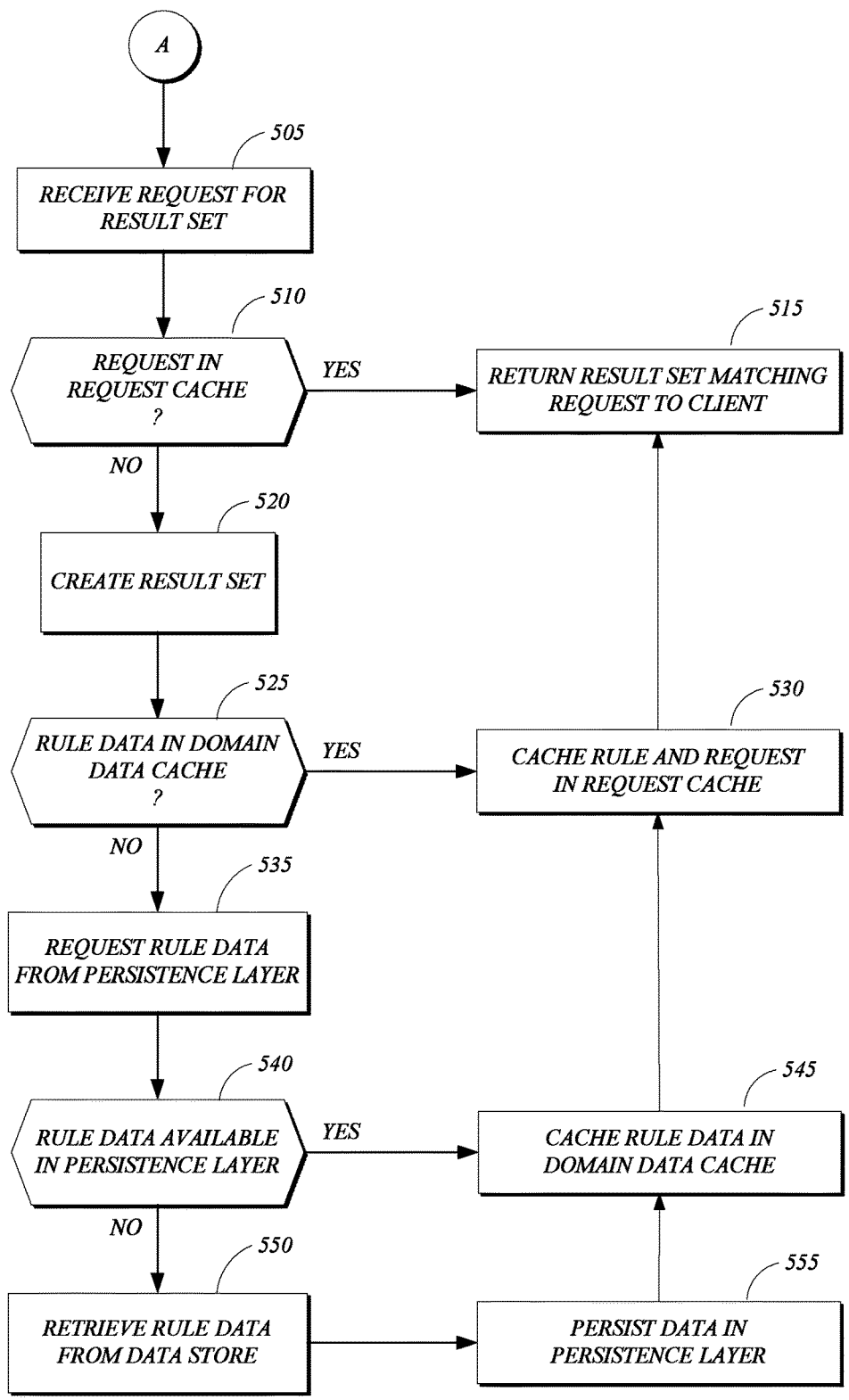
FIG. 5 is a flow diagram illustrative of an example of another process for processing payments.

FIGS. 4 and 5 are flow diagrams illustrative of examples of processes for processing payments with embodiments of the payment platform 100. The flow diagram of FIG. 4 illustrates a process that may be performed by payment transaction manager 110 and FIG. 5 illustrates a process that may be performed by routing manger 120. The processes of FIG. 4 and FIG. 5 may be performed by either payment transaction manger 110 or routing manager 120, or some other computing system that may be part of payment platform 100.

At block 405, payment transaction manager 110 receives a request for payment processing. As described, the request may come from one of business entity computing systems 170. The request may contain criteria for processing the payment. The criteria are advantageously used by payment transaction manager 110 to determine, at block 410, whether a workflow has been created for the requested transaction. If a workflow has been created, payment transaction manager need not determine a new payment processor for the transaction request and, at block 415, may process the payment using the payment processor associated with the workflow. If a workflow has not been created, processing moves to block 420.

At block 420, payment transaction manager 110 checks result cache 215 to determine if a result set matching the criteria of the request has been recently received from routing manager 120. If so, decision engine 210 may, at block 425, dynamically select a payment processor from the result set according to the decision rule stored in the metadata of the result set. Payment transaction manager 110 may then create and start a new workflow, at block 430, and then process the payment using the selected payment processor. If there is no result set matching the criteria of the request in the result cache, payment transaction manager 110 may, at block 435, request a result set from routing manager 120. The processing of requests made of routing manager 120 is described with respect to FIG. 5. Once the result set is received from routing manager 120, processing proceeds to block 450 where the received result set is stored in result cache 215, processing proceeds to block 425, where the decision engine 210 dynamically selects a payment processor, starts a work flow, and then processes payment using the selected payment processor.

FIG. 5 illustrates a flow diagram of processing steps for routing manager 120 once a request for a payment processor result set is received from payment transaction manager 110. At block 505, routing manager 120 receives a request from payment transaction manager 110 for a result set including one or more payment processors. The request may contain criteria, or data elements, such as those described with respect to FIG. 3. Routing manager 120 may then check request cache 220 to determine if a result set matching the criteria of the request exists within it. If so, processing moves to block 515 and the matching result set is communicated to the payment transaction manager. If a matching result set is not stored in request cache 220, processing then moves to block 520 where rule processing engine 221 creates a result set.

At block 520, rule processing engine 221 creates a result set matching the criteria of the request. The result set may contain data corresponding to one or more payment processor results. Rule processing engine 221 may first proceed to create the result set by determining the payment processors that would best process the criteria indicated in the request sent from payment transaction manager. Rule processing engine 221 may access, at block 525, domain data cache 222 for payment processor data. If domain data cache 222 contains matching payment processor data, rule processing engine 221 advantageously adds each matching payment processor to the result set. If, however, domain data cache 222 does not contain matching payment processor data, rule processing engine 221 may request payment processor data from persistence layer 223 at block 540. If the appropriate data is currently persisted in persistence layer 223, persistence layer 223 returns the data to rule processing engine 221, and the data is also added cached in domain data cache 222 at block 545. If however, the data is not persisted in persistence layer 223, persistence layer 223 may access the required data from data storage 250 at block 550 and then continue to persist the data at block 555.

Once rule processing engine 221 adds the payment processor data to the result set, it may then determine a decision rule appropriate for the result sets. Rule processing engine 221 may request the decision rule from domain data cache 222, or if it is unavailable in the domain data cache 222, request the decision rule from persistence layer 223. Once rule processing engine receives a decision rule for the payment processors, the result set is finalized and cached in request cache at block 515. Routing manager 120 then responds to the request from payment transaction manager 110 by communicated the created result set back to payment transaction manager 110.

CONCLUSION

Although certain embodiments have been described in the context of a payment platform used by an electronic catalog system, other embodiments of the payment platform may be used other businesses or entities that have a need for payment processing services (e.g., retail or wholesale stores, suppliers, vendors, manufacturers, health service providers, etc.).

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method of communicating a payment transaction to a payment processor, the method comprising:
   receiving, by a transaction manager computer system comprising computing hardware, a request to process a payment transaction, the request comprising payment transaction data;
   determining, by the transaction manager computer system, whether to retrieve payment processing data from a routing manager computer system comprising computing hardware based at least in part on whether payment processing data matches the payment transaction data stored in a payment processor result cache;
   in response to a determination that the payment processing data does not match the payment transaction data and to retrieve the payment processing data from the routing manager computer system comprises,
      generating, by the transaction manager computer system, a request to the routing manager computer system for the payment processing data, the request comprising: (1) an identifier associated with the client computer system, (2) a payment operation type, (3) a currency type, and (4) a payment instrument type;
   communicating, by the transaction manager computer system, the request to the routing manager computer system;
   receiving, by the transaction manager computer system from the routing manager computer system, transaction processing data;
   in response to a determination to retrieve the transaction processing data from the payment processor result cache,
      retrieving, by the transaction manager computer system, the transaction processing data from the payment processor result cache;
   wherein the transaction processing data comprises:
      a plurality of payment processing routing options, the payment processing routing options identifying a plurality of payment processors for processing a payment transaction; and
      a decision rule associated with the plurality of payment processing routing options, the decision rule comprising selection criteria for selecting a payment processing routing option;
      wherein the decision rule comprises a hierarchical-based value associated with individual ones of the plurality of payment processing routing options that indicates:
         a sequential order identifying a first payment processor and a second payment processor, and
         a period of time that the payment transaction data may be sent to the first payment processor before the payment transaction data is sent to the second payment processor; and
   communicating, by the transaction manager computer system, the payment transaction data to the first payment processor and the second payment processor in accordance with the decision rule.

2. The method of claim 1, further comprising:
   assigning a workflow identifier to the payment transaction data and the particular payment processor.

3. The method of claim 1, wherein the determining whether to retrieve payment processing data is based at least in part on whether a workflow identifier has been assigned to the payment transaction data.

4. The method of claim 1, wherein the decision rule comprises an indication of the number of communications containing payment transaction data made to individual ones of the plurality of payment processing routing options.

5. The method of claim 1, wherein the transaction manager computer system and the routing manager computer system are part of a client-server architecture.

6. A system for managing payment transactions, the system comprising:
   a computer system comprising computer hardware;
   a payment processor result cache configured to store payment processing data; and
   non-transitory, tangible computer storage configured to store instructions that when executed cause the computer system to:
      access payment transaction data;
      determine whether to retrieve payment processing data from a routing manager computer system based at least in part on whether the payment transaction data matches the payment processing data stored in the payment processor result cache;

based at least in part on a determination that the
payment transaction data does not match the payment processing data,
communicate a request for payment processing data
to a routing manager computer system;
receive payment processing data from the routing
manager computer system;
based at least in part on a determination that the
payment transaction data matches the payment processing data,
retrieve the payment processing data from the payment processor result cache;
access the payment processing data, the payment processing data comprising:
a plurality of payment processing routing options;
and
a payment processing decision rule associated with
the plurality of payment processing routing
options;
wherein the payment processing decision rule comprises a hierarchical-based value associated with
individual ones of the plurality of payment processing routing options that indicates:
a sequential order identifying a first payment
processor and a second payment processor, and
a period of time that the payment transaction data
may be sent to the first payment processor
before the payment transaction data is sent to
the second payment processor; and
process a transaction by communicating the payment
transaction data to the first payment processor and
the second payment processor in accordance with the
decision rule.

7. The system of claim 6, wherein the request for payment processing data is accessed from a routing manager computing system.

8. The system of claim 6, further comprising:
non-transitory computer storage comprising a payment processor result cache, and
wherein the request for payment processing data is accessed from the payment processor result cache.

9. The system of claim 6, wherein the instructions further cause the processor to:
associate a work flow indicator with the payment transaction data.

10. The system of claim 6, wherein the decision rule comprises an indication of the number of communications containing payment transaction data made to individual ones of the plurality of payment processing routing options.

11. A method for providing payment processing data, the method comprising:

receiving, by a routing manager computer system comprising computing hardware, a request for payment
processing data from a transaction manager computer
system comprising computing hardware;
extracting, by the routing manager computer system,
payment processing parameters from the request;
determining, by the routing manager computer system, a
plurality of payment processing routing options based
at least in part on the extracted payment processing
parameters;
determining, by the routing manager computer system, a
payment processing decision rule associated with the
determined plurality of payment processing routing
options, wherein the payment processing decision rule
associated with the determined plurality of payment
processing routing options comprises a hierarchical-
based value associated with individual ones of the
plurality of payment processing routing options that
indicates:
a sequential order identifying a first payment processor
and a second payment processor, and
a period of time that payment transaction data may be
sent to the first payment processor before the payment transaction data is sent to the second payment
processor; and
communicating, by the routing manager computer system, the payment processing decision rule to the transaction manager computer system,
wherein the payment processing rule is stored in a payment processor result cache for processing subsequent
requests to process a payment transaction.

12. The method of claim 11, wherein the payment processing parameters comprise:
an identifier associated with the client computer system,
a payment operation type,
a currency type, and
a payment instrument type.

13. The method of claim 12, wherein at least one of the payment processing parameters can be set so that information associated with the payment processing parameter is not changed by subsequent processing by the routing manager or the transaction manager.

14. The method of claim 11, wherein the routing manager computer system and the transaction manager computer system are part of a client-server architecture.

15. The method of claim 11, wherein the decision rule comprises an indication of the number of communications containing the payment transaction data made to individual ones of the plurality of payment processing routing options.

* * * * *